(12) United States Patent
Chryss et al.

(10) Patent No.: US 11,378,533 B2
(45) Date of Patent: Jul. 5, 2022

(54) DETECTING SETTLED SOLIDS IN A CONDUIT FOR TRANSPORTING A SLURRY

(71) Applicant: Commonwealth Scientific and Industrial Research Organisation, Acton (AU)

(72) Inventors: Andrew George Chryss, Acton (AU); Krishna Mohanarangam, Acton (AU)

(73) Assignee: COMMONWEALTH SCIENTIFIC AND INDUSTRIAL RESEARCH ORGANISATION, Acton (AU)

( * ) Notice: Subject to any disclaimer, the term of this patent is extended or adjusted under 35 U.S.C. 154(b) by 45 days.

(21) Appl. No.: 16/649,727

(22) PCT Filed: Sep. 25, 2018

(86) PCT No.: PCT/AU2018/051048
§ 371 (c)(1),
(2) Date: Mar. 23, 2020

(87) PCT Pub. No.: WO2019/060952
PCT Pub. Date: Apr. 4, 2019

(65) Prior Publication Data
US 2020/0256814 A1 Aug. 13, 2020

(30) Foreign Application Priority Data
Sep. 26, 2017 (AU) ................ 2017903902

(51) Int. Cl.
*G01N 25/00* (2006.01)
*G01N 25/72* (2006.01)
(Continued)

(52) U.S. Cl.
CPC ............. *G01N 25/72* (2013.01); *G01K 1/026* (2013.01); *G01K 1/143* (2013.01); *G01K 7/02* (2013.01); *G01K 13/02* (2013.01)

(58) Field of Classification Search
USPC ............................ 374/45, 57, 5, 166, 148, 7
See application file for complete search history.

(56) References Cited

U.S. PATENT DOCUMENTS

2018/0170783 A1* 6/2018 Baxter ............... C02F 11/125
2020/0278229 A1* 9/2020 Ilgner ..................... G01F 1/74

FOREIGN PATENT DOCUMENTS

WO WO 2006/111832 A2 10/2006
WO WO 2012/035483 A2 3/2012
WO WO 2016/044866 A1 3/2016

OTHER PUBLICATIONS

International Search Report for PCT application No. PCT/AU2018/051048, dated Nov. 5, 2018.
(Continued)

*Primary Examiner* — Mirellys Jagan
(74) *Attorney, Agent, or Firm* — Crowell & Moring LLP

(57) ABSTRACT

A device (100) for detecting settled solids (300) in a conduit (200) for transporting slurry. The device (100) comprises a housing (110) positionable to define at least a segment of a flow path for the slurry. The device (100) comprises a reference temperature sensor (140) associated with the inside of the housing 110 in order to measure an ambient temperature of the slurry within the conduit. The device (100) further comprises a plurality of heaters (150) spaced around part of the inside circumference housing (110) that are maintained at a target temperature that is higher titan the ambient temperature of the slurry.

19 Claims, 12 Drawing Sheets

(51) Int. Cl.
    *G01K 1/02*           (2021.01)
    *G01K 1/143*         (2021.01)
    *G01K 7/02*           (2021.01)
    *G01K 13/02*         (2021.01)

(56) References Cited

OTHER PUBLICATIONS

Written Opinion for PCT application No. PCT/AU218/051048, dated Nov. 5, 2018.
International-Type Search for Provisional Patent Application, for corresponding Australian provisional patent application No. 2017903902, dated Nov. 1, 2017.

* cited by examiner

DETECTING SETTLED SOLIDS IN A CONDUIT FOR TRANSPORTING A SLURRY

CROSS-REFERENCE TO RELATED APPLICATIONS

The present application is the U.S. National Stage application of PCT Application No. PCT/AU2018/051048, filed on Sep. 25, 2018, designating the United States, which claims priority from Australian Patent Application No 2017903902 filed on Sep. 26, 2017, the content of which is incorporated herein by reference.

TECHNICAL FIELD

The present disclosure relates to the transport of slurries along conduits, and more particularly, to devices, systems and methods for detecting settled solids in a conduit for transporting slurry.

BACKGROUND

A common method of transporting solids is to pump these solids suspended in a carrier fluid via pipelines and open channels using a pump or gravity, for example, the transport of mineral slurries (tailings and ore) in the mining industry, crude oils containing wax and minerals in the oil industry, concrete in the construction industry, and in food and pharmaceutical systems.

For a given system, the minimum conveying velocity of a slurry is defined as the mean fluid velocity in the principle direction of flow at which solid particles will settle out of suspension due to gravity. The minimum conveying velocity varies from system to system and is dependent on a number of factors including the density and composition of the slurry, the particle size distribution of the solids in the slurry, and conduit properties such as diameter and other geometry factors.

At velocities below the minimum conveying velocity, solids in the slurry will settle in the conduit to form a settled bed of solids, which may be static, sliding or sheared. The settled solids will typically start at the lowpoint of the conduit. The amount of solid that settled is also referred to as depth (height) of settled solids. An increase in the depth of the settled bed of solids can lead to pumping failure due to increased pressure gradients and blockages in the conduit. In a horizontal cylindrical pipe, the lowpoint of the conduit is defined as the invert of the pipe, as opposed to the highpoint of the conduit which is defined as the obvert.

Operating at conveying velocities above the minimum conveying velocity can assist in preventing solids from settling from the slurry and the associated problems. However, operating at conveying velocities above the minimum conveying velocity increases energy requirements and costs, as well as accelerates wear of the conduit. Similarly, reducing the minimum conveying velocity by increasing the fluid content of the slurry also results in increased energy costs due to pumping the excess fluid.

Ideally, to reduce energy consumption and wear of the conduits, while at the same time preventing solids from settling from the slurry, the slurry will be pumped at a conveying velocity just above the minimum conveying velocity. It is also desirable to monitor conditions in the conduit during operation in order to detect the beginning of solids settling from the slurry such that action can be taken, for example, increasing the conveying velocity before a significant depth of settled solids can form.

There have been a number of proposals for detecting settled solids in conduits for transporting slurry. In one example, a rotating gamma gauge comprising a gamma source and a detector is rotated around the circumference of a pipe and the amount of radiation absorbed is monitored. Such equipment is expensive and requires the use of a radioactive isotope source, leading to health and safety concerns.

WO 2012/035483 A2 (CSIR et al) discloses a method for monitoring slurry flow conditions by mounting one or more heaters and sensors to the outer wall of a pipe. The method of WO 2012/035483 relies on heating the slurry monitoring of slurry temperatures which occurs through the pipe walls. In this way that the heaters and sensors are not directly exposed to the slurry, preventing abrasive damage of the heaters and sensors by the slurry.

WO 2016/111832 A1 (CSIR) similarly discloses a method for monitoring slurry flow conditions in a pipeline comprising heating the slurry and sensing the temperature of the slurry at points of the pipe. As for WO 2012/035483 A2, the heaters and sensors of WO 2016/111832 A1 (CSIR) are positioned on the outer wall of the pipe to protect the heaters and sensors from damage.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

A device for use in detecting settled solids in a conduit for transporting slurry, comprising:

a housing to define at least a segment of a flow path of the slurry;

a reference temperature sensor associated with an inside of the housing to measure an ambient temperature of the slurry; and a plurality of heaters spaced on at least part of a circumference of the inside of the housing that are maintained at a target temperature that is higher than the ambient temperature of the slurry.

It is an advantage of the device that it avoids the use of a gamma source and in turn reduces related costs and improves safety. It is a further advantage that the device is able to heat the slurry directly reducing costs by not heating unnecessary features of a slurry system, such as a wall of a conduit. It is a further advantage that, by mounting the heaters and sensors on the inside circumference of the housing, and by monitoring the power consumed in maintaining the heaters at predetermined target temperatures, the condition of slurry flow in the pipe can be more accurately determined. It is a further advantage that spacing heaters circumferentially gives a better distribution of heaters around the conduit and therefore better insight into the presence of settled solids in a larger cross section of the conduit and better accuracy for conduits that undergo significant changes in elevation. It is a further advantage that the housing can be configured to thermally insulate the heaters from one another. Moreover, the configuration of the housing is such that the integrity of the pipe is not compromised by the inclusion of additional heaters. In addition, since the target temperature is based on the ambient temperature, the target temperature can be dynamic and in turn can save energy costs.

The housing may be configured such that the heaters are thermally isolated from one another, for example the housing may be formed of a thermally insulating material such that the heat produced by one heater is not transferred through the housing to one or more adjacent heaters. Additionally or alternatively, the position of the heaters in the housing may be selected such that the heaters are thermally insulated from one another.

The target temperature may be only slightly above the ambient temperature of the slurry, for example the target temperature may be no more than 10° C. above the ambient temperature of the slurry. Preferably, the target temperature is greater than any likely short term variations in the ambient temperature of the slurry.

The housing may comprise a pair of annular flanges joined by a cylindrical conduit to define the segment of the flow path. The flanges may have apertures for receiving fasteners to mount the housing to the conduit.

The reference temperature sensor may be associated with the housing by being positioned at or near an obvert of the housing. At least one heater may be positioned at or near an invert of the housing. Alternatively or additionally, a reference temperature sensor may be positioned below a midpoint of the housing to allow for operation under slack flow (i.e. flow of a less than full conduit).

Surfaces of the reference temperature sensor and plurality of heaters may be substantially continuous and level with an inner surface of the housing. The surface of the reference temperature sensor and plurality of heaters may be replaceable.

The plurality of heaters may be substantially linearly aligned along at least part of the circumference of the inside of the housing. The reference temperature sensor may be substantially linearly aligned with the plurality of heaters.

The temperature sensor may comprise an electrical temperature sensor. For example, the temperature sensor comprises a thermocouple, a thermistor, or a resistance thermometer.

Each heater may further comprise a thermocouple for monitoring the temperature of the heater.

Each heater may further comprise a temperature control module for maintaining each heater at the target temperature.

A system for detecting settled solids in a conduit for transporting a slurry comprising:

the device described above, with or without the optional features;

a meter for measuring power consumed by the plurality of heaters; and a processor configured to determine an indication of whether there are settled solids in the conduit based on the power consumed by the plurality of heaters.

The heater may comprise a temperature control module, wherein the temperature control module utilises a proportional-integral-derivative (PID) control loop feedback mechanism to maintain the temperature heaters at the target temperature.

A method for detecting settled solids in a conduit for transporting a slurry, the method comprising:

measuring an ambient temperature of a slurry in the conduit;

supplying power to a plurality of heaters that are spaced on at least part of a circumference inside the conduit to maintain the heaters at a target temperature that is higher than the ambient temperature of the slurry;

measuring power consumed by the plurality of heaters; and determining an indication of whether there are settled solids in the conduit based on the power consumed by the plurality of heaters.

The method may further comprise determining the depth of the settled solids in the conduit.

BRIEF DESCRIPTION OF DRAWINGS

Embodiments of the present disclosure will now be described, by way of example only, with reference to the accompanying drawings in which.

DESCRIPTION OF EMBODIMENTS

Referring to FIGS. 1 to 4 and 8, there is provided a device 100 for detecting settled solids 300 in a conduit 200 for transporting slurry. The device 100 will be described as used with a cylindrical pipe 200 as the conduit. The cylindrical pipe 200 has a diameter A. It will be appreciated that the device 100 can be used with various configurations of conduit, including open and closed conduits of various cross-sectional geometries.

Figure 8:
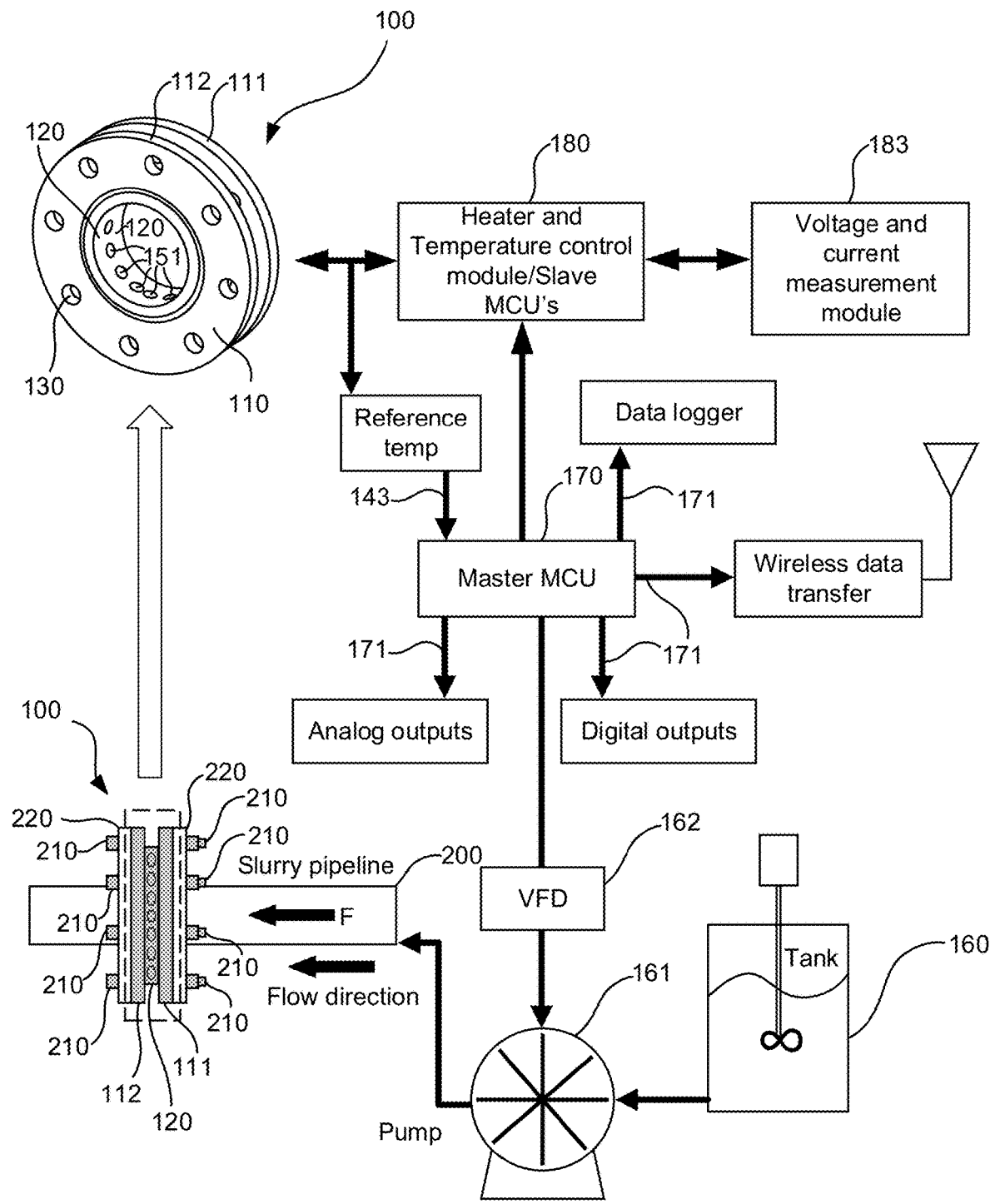
FIG. 8 is a schematic diagram of a device and method for detecting settled solids in a conduit for transporting a slurry according to an embodiment of the present disclosure.

Referring to FIG. 8, the device 100 comprises a housing 110 positionable to define at least a segment of a flow path F for the slurry. The housing 110 may be integral with the conduit 200 or may separate but be contiguous with the conduit to define the flow path. In the example of FIG. 8, the housing 110 is separate but contiguous, such that the inner surface of the pipe 200 and housing 110 form a substantially level surface that will not impede the flow of the slurry. In this sense, the housing 110 is considered part of the conduit for transporting the slurry so detecting settled solids in the housing 110 is in turn detecting of settled solids in the conduit.

Figure 1:
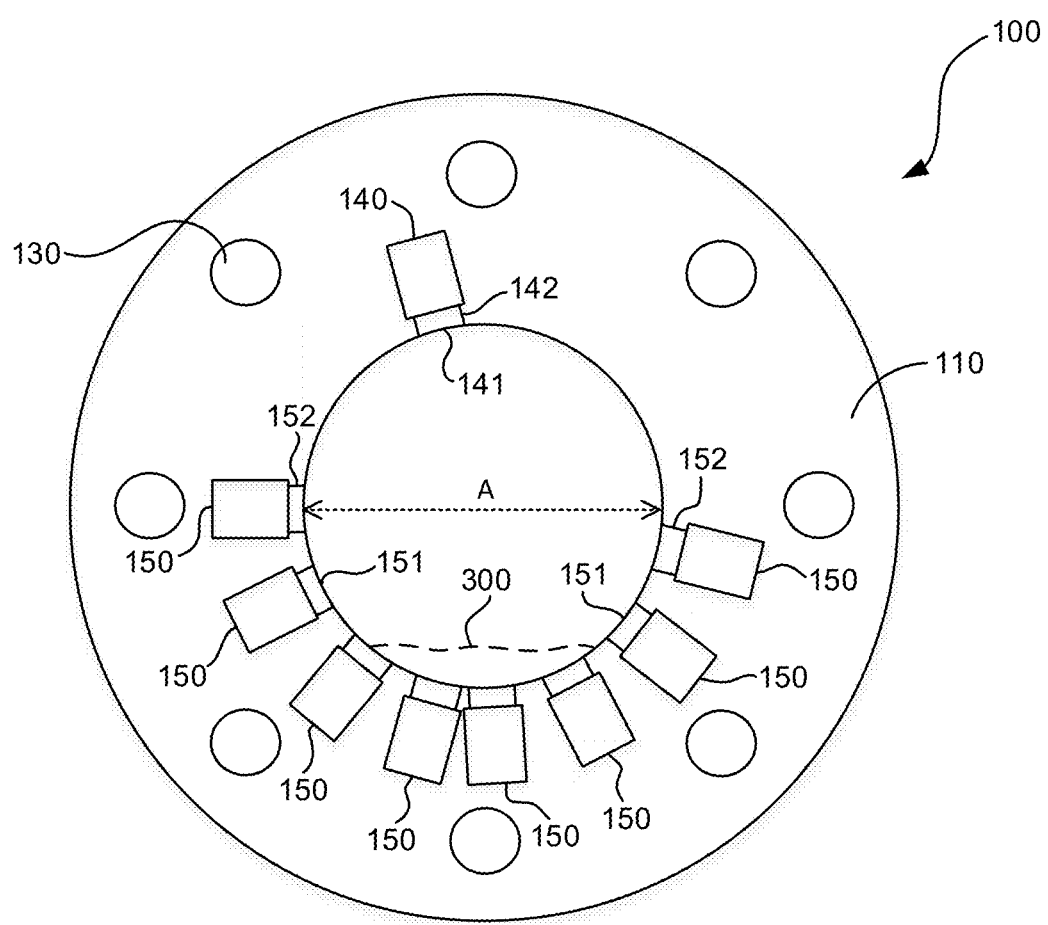
FIG. 1 is a cut away front view of a device for detecting settled solids in a conduit for transporting a slurry according to an embodiment of the present disclosure.
Figure 2:
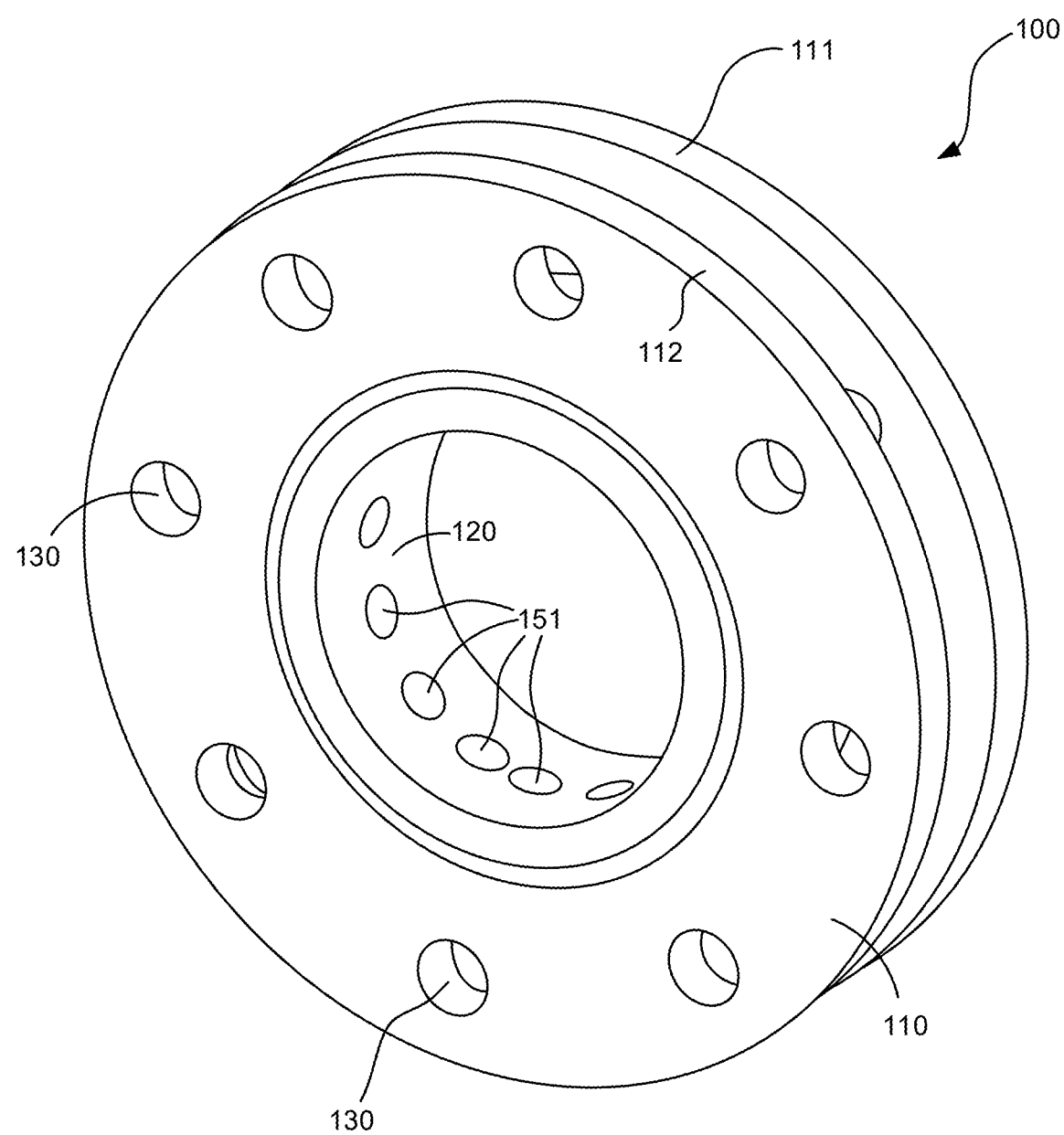
FIG. 2 is a perspective view of the device of FIG. 1.

As best shown in FIG. 2, the housing 110 is formed of a pair of solid annular flanges 111, 112 joined by a cylindrical conduit section 120. In this example, the inner surface of the cylindrical conduit section 120 defines the segment of the flow path. The flanges 111, 112 have apertures 130 that are circumferentially spaced around the cylindrical conduit section 120 and each receive a fastener, such as a bolt 210, in order to mount the device 100 to flange 220 on the pipe 200.

Figure 3:
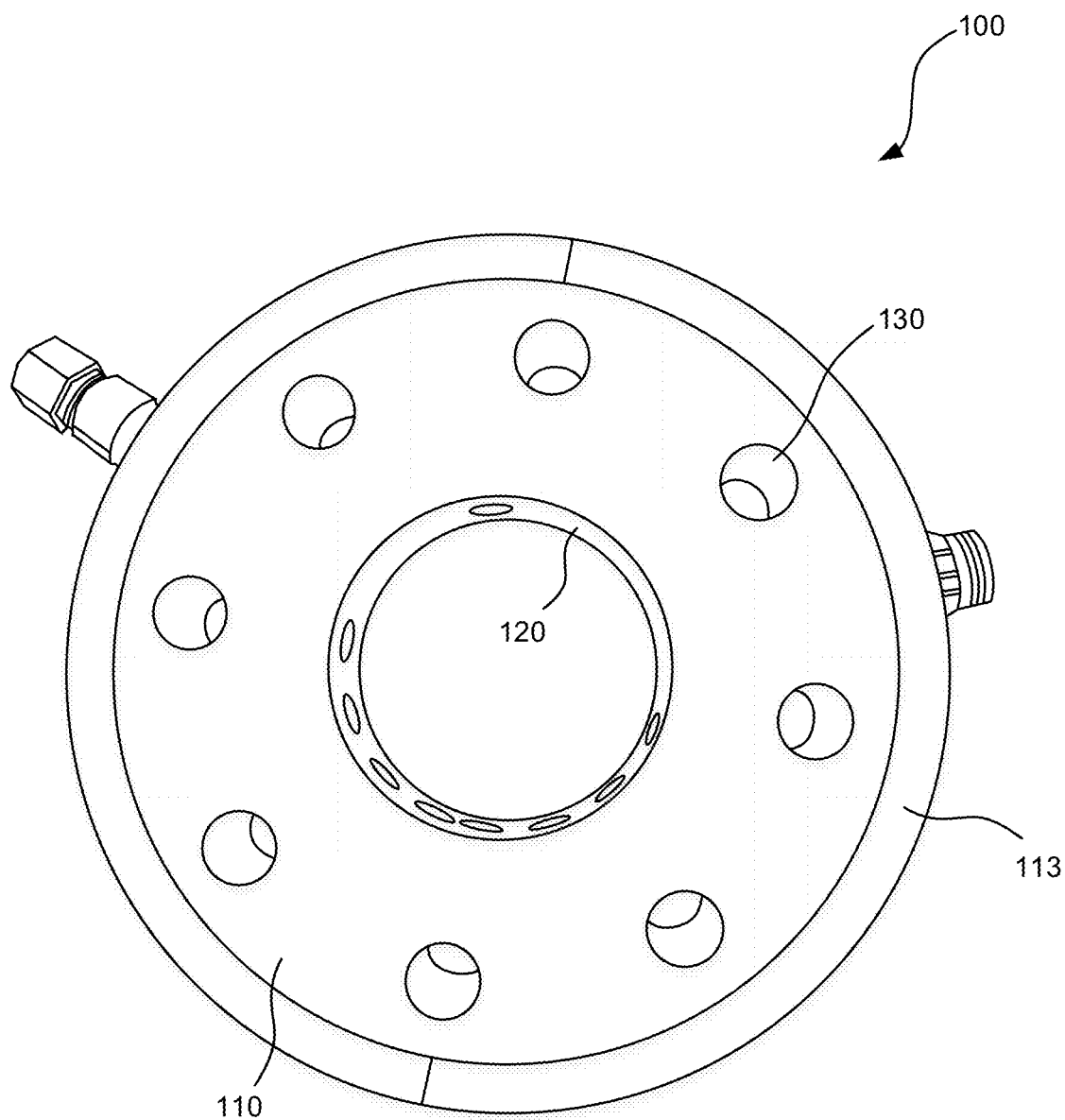
FIG. 3 is a front simplified view of a device for detecting settled solids in a conduit for transporting a slurry according to an embodiment of the present disclosure.
Figure 4:
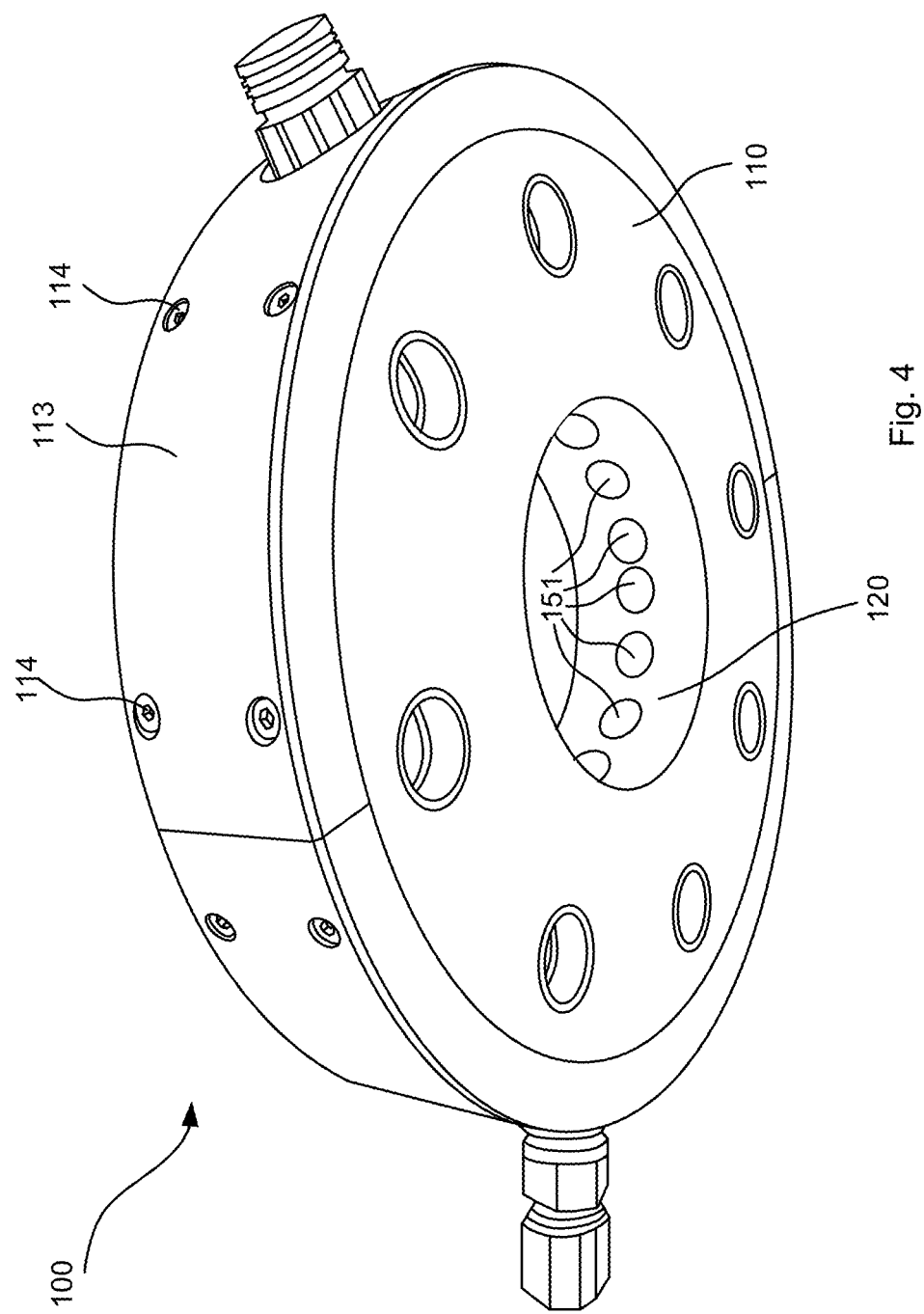
FIG. 4 is a perspective simplified view of the device of FIG. 3.

As shown in FIGS. 3 and 4, the device 100 may further comprise a cylindrical casing 113 surrounding the outer circumference of the housing 110 and connected to the outer circumferences of the flanges 111, 112 by fasteners, such as screws 114.

The device 100 comprises a reference temperature sensor 140 associated with the inside of the housing 110 in order to measure an ambient temperature of the slurry within the conduit. The reference temperature sensor 140 may be any suitable device for measuring temperature, for example the temperature sensor may be an electrical temperature sensor such as a thermocouple, thermistor, or resistance thermometer. The reference temperature sensor 140 is built into the housing such that only the surface of one end 141 of the reference temperature sensor 140 is exposed to the flow path, and in particular, the surface of the end 141 is configured to form a continuous and substantially level surface with the inner surface of the cylindrical conduit section 120 to minimise wear of the temperature sensor from the flow of abrasive slurries and to not impede the flow of the slurry.

The device 100 further comprises a plurality of heaters 150 spaced around part of the inside circumference housing 110. In this example the heaters are spaced substantially linearly in a direction perpendicular to the direction of the flow F and also linearly aligned with the temperature sensor 140. The heaters are linearly aligned to the extent that combined they are able to detect and measure the depth of at least a single cross section of the settled solids in the conduit. This may be the substantially the same linear alignment with the sensor 140 such that overall the housing 120 is a narrow section of pipe.

The plurality of heaters 150 are configured to be maintained at a target temperature. The target temperature is based on the ambient temperature of the slurry as measured by the sensor 140. In this example, the target temperature is greater than the ambient temperature of the slurry measured by temperature sensor 140. Preferably, the target temperature is only slightly above the ambient temperature of the slurry, for example the target temperature is no more than 10° C. above the ambient temperature of the slurry. The target temperature may be selected to be greater than expected short term temperature variations of the ambient temperature of the slurry. Similarly to the temperature sensor, an end of each heater 151 is configured to form a continuous and level surface with the inner surface of the cylindrical conduit section 120. The heaters 150 may each further comprise a thermal sensor such as a thermocouple 153 for measuring the temperature of the slurry immediately adjacent thereto.

Optionally, the temperature sensor 140 includes a removable cap 142 and the heaters 150 include removable caps 152. The removable caps 142 and 152 protect the main components of the temperature sensor 140 and heaters 150 from the slurry and also allow for replacement of the cap component as wear occurs.

Due to gravitational forces, the formation of a settled bed of solids typically begins at the lowest point of the conduit, for example at the invert of a horizontal cylindrical pipe. To monitor for the initial stages of formation of a settled bed of solids in the pipe, at least one heater 150 is positioned at or near the invert of the housing. Additional heaters are circumferentially spaced around the housing to measure the growth and depth of the settled bed of solids 300 in the pipe 200.

The temperature sensor 140 is positioned spaced circumferentially as far away from the heaters 150 as possible such that the measured ambient temperature of the slurry is not influenced by heat generated by the heaters. For a cylindrical pipe, for example, the heaters may be positioned around the lower half of the housing where the formation of the settled bed of solids typically begins. The heaters 150 may be equispaced or they can be distributed in a way that their density is increased towards the centre of the invert of the housing 120. The optimal spacing allows for complete monitoring of the vertical component of the conduits circumference, with minor vertical overlap between adjacent sensors. The temperature sensor 140 is positioned in the upper half of the housing, away from the effects of the heaters 150, such as at the obvert of the housing 120. For non-cylindrical or open conduits, the temperature sensor can similarly be positioned in an upper segment of the conduit, spaced as far as possible from the plurality of heaters positioned in a lower segment of the conduit.

The reference temperature sensor may be positioned at any location of the conduit such that an ambient temperature of the slurry can be measured. For example, where the slurry flow is operating under slack flow conditions (i.e. flow of a less than full conduit), a reference temperature sensor may be positioned in the lower segment of the conduit, for example at the highest point of the conduit that contact with flowing slurry will still occur.

The housing 110 is formed of a thermally insulating material (e.g. thermal conductivity<1 W/(m·K)). The temperature sensor 140 and heaters 150 are positioned in the housing 110 so as to be thermally insulated from one another.

Figure 9:
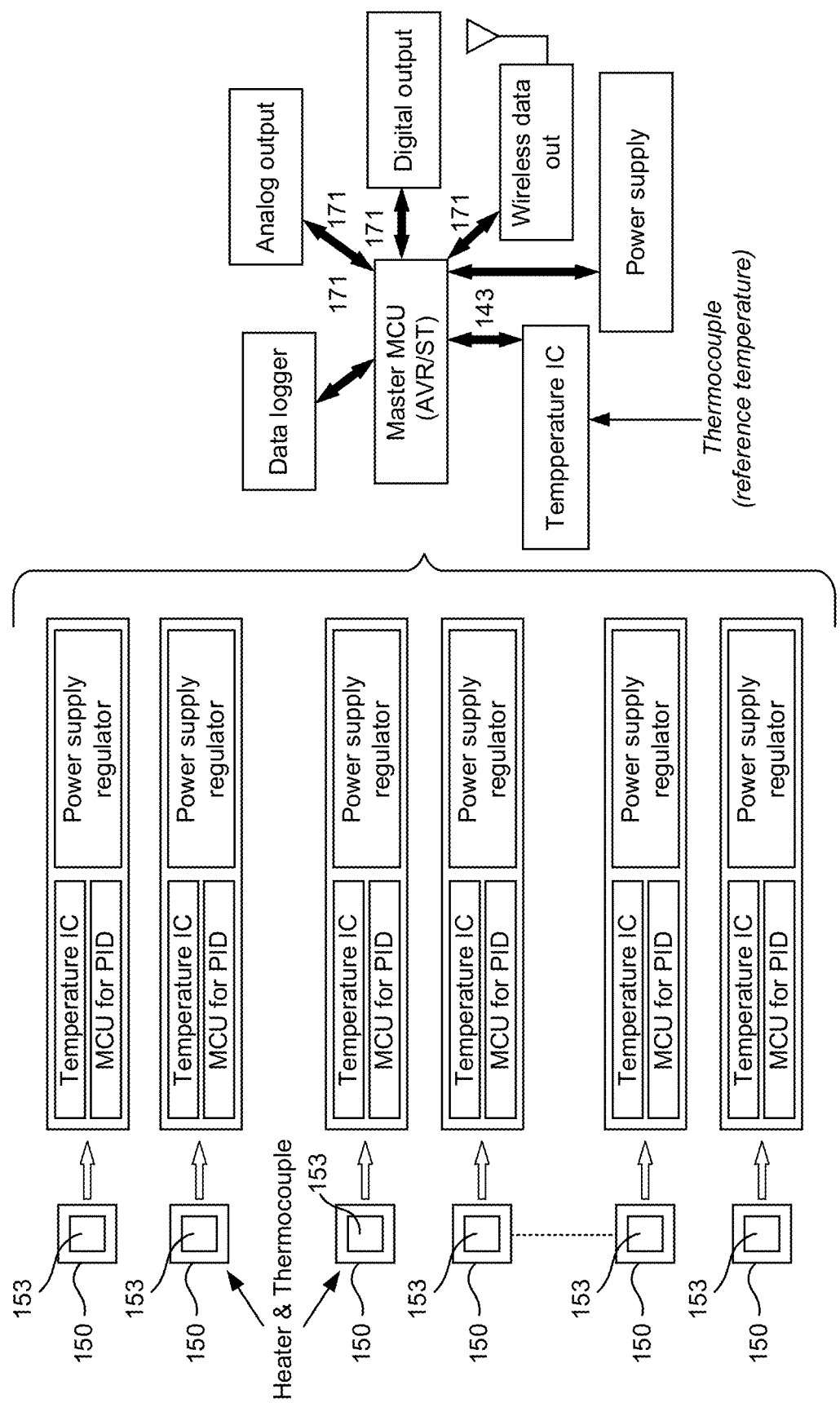
FIG. 9 is a schematic diagram of the plurality of heaters of FIG. 7.

Referring to FIGS. 8 and 9, each heater 150 is associated with a temperature sensor such as a thermocouple 153 that senses the temperature of the respective heater 150. A temperature and control module 180 receives temperature data from each thermocouple 153 and provides a control output to the heaters 150 to maintain each heater 150 the target temperature. Preferably, the heater and temperature control module 180 utilises a proportional-integral-derivative (PID) control loop feedback mechanism to maintain the temperature of the slurry adjacent each heater at the target temperature.

A meter comprising a voltage and current measurement module 183 is provided for measuring power consumed by each of the plurality of heaters 150 in maintaining the heaters 150 at the target temperature. The amount of power consumed by each of the heaters is related to respective amount of settled solids adjacent to the heater, and in particular, the coverage the settled solids makes over the end 151 of the respective heater 150 and in the immediate area around the end 151 of the respective heater 150. Therefore typically the lower the power consumption the higher the probability is that there are settled solids in the conduit.

Figure 5:
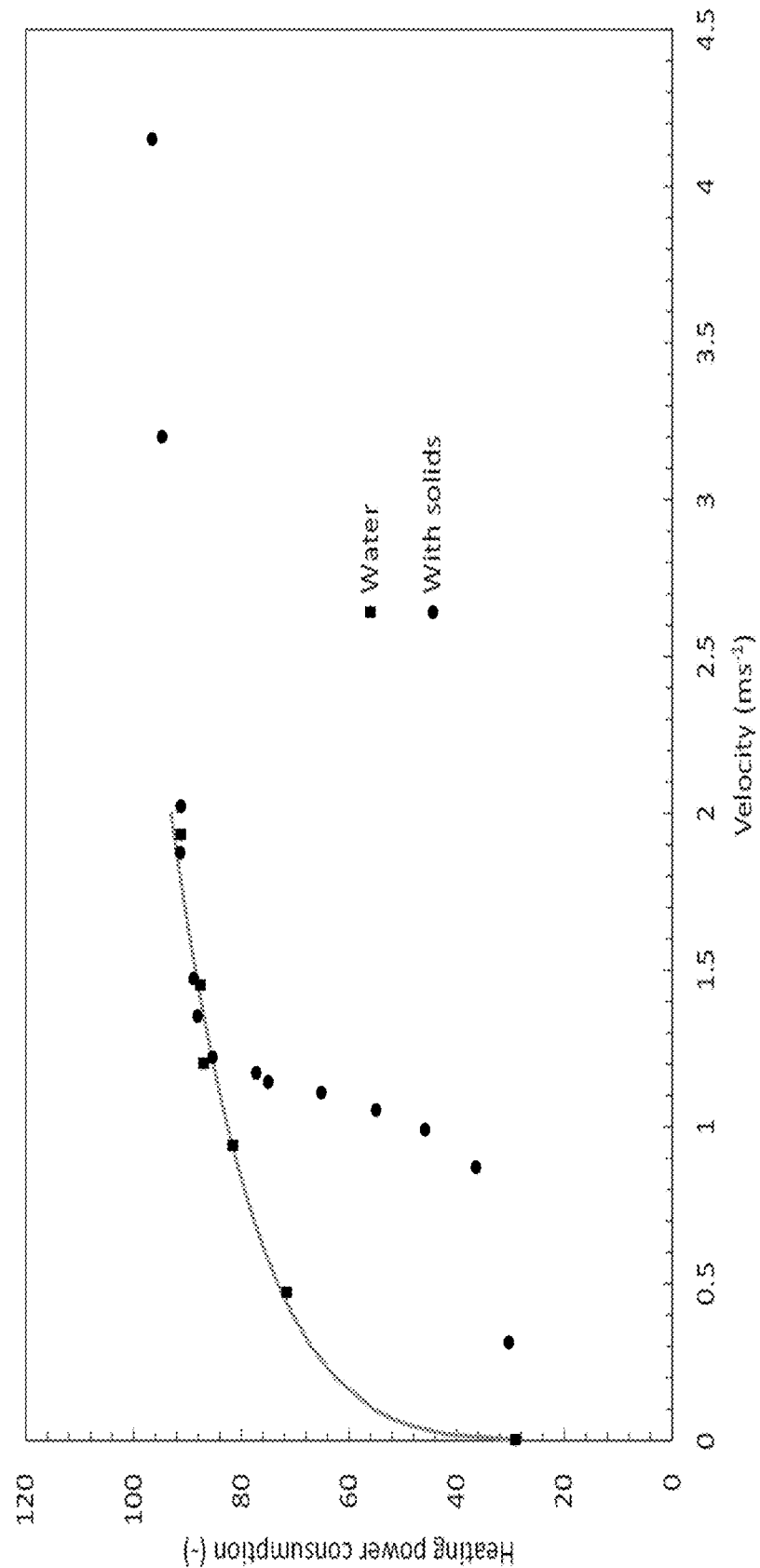
FIG. 5 is a graph depicting power consumption change with axial flow of fluid in a pipe according to an embodiment of the present disclosure.
Figure 6:
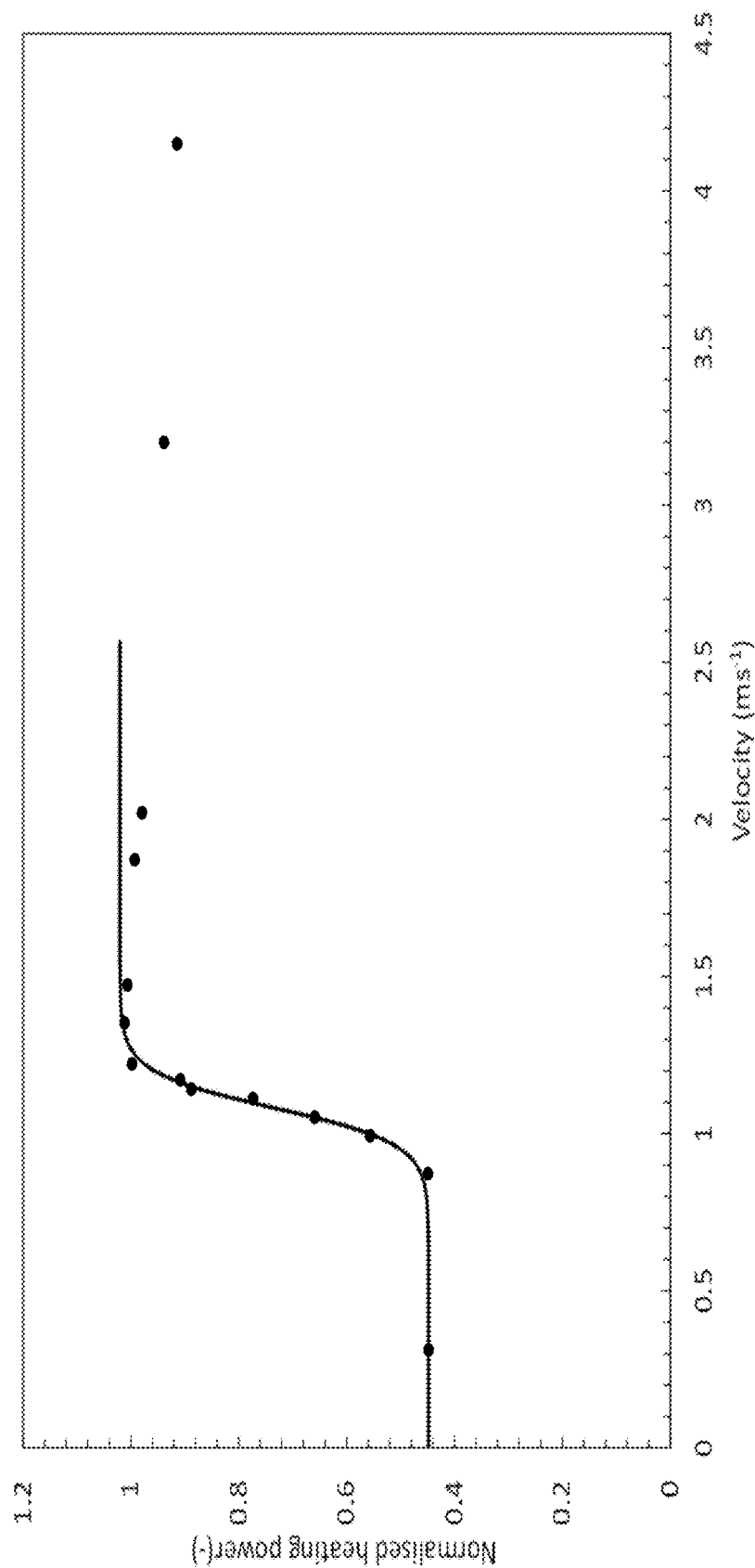
FIG. 6 is a graph depicting a normalised variation power consumption with axial flow rate of the data of FIG. 4.

Prior to installation of the device 100, the power consumption of each heater 150 is calibrated for a range of flow conditions. An example of a calibration can be seen in FIG. 5 which shows the power consumption of a heater for a fluid only in comparison to that of a slurry containing solids. This data can be normalised by dividing the "with solids" value by the "fluid only" value and plotting the quotient, as shown in FIG. 6. The lower plateau in power shown in FIG. 6 indicates that the end of the heater is fully covered by settled solids and the upper plateau indicates that the end of the heater is free of settled solids. The transition area between the lower and upper power consumption plateaus is proportional to the amount of area the end of the heater that is covered by settled solids.

Figure 7:
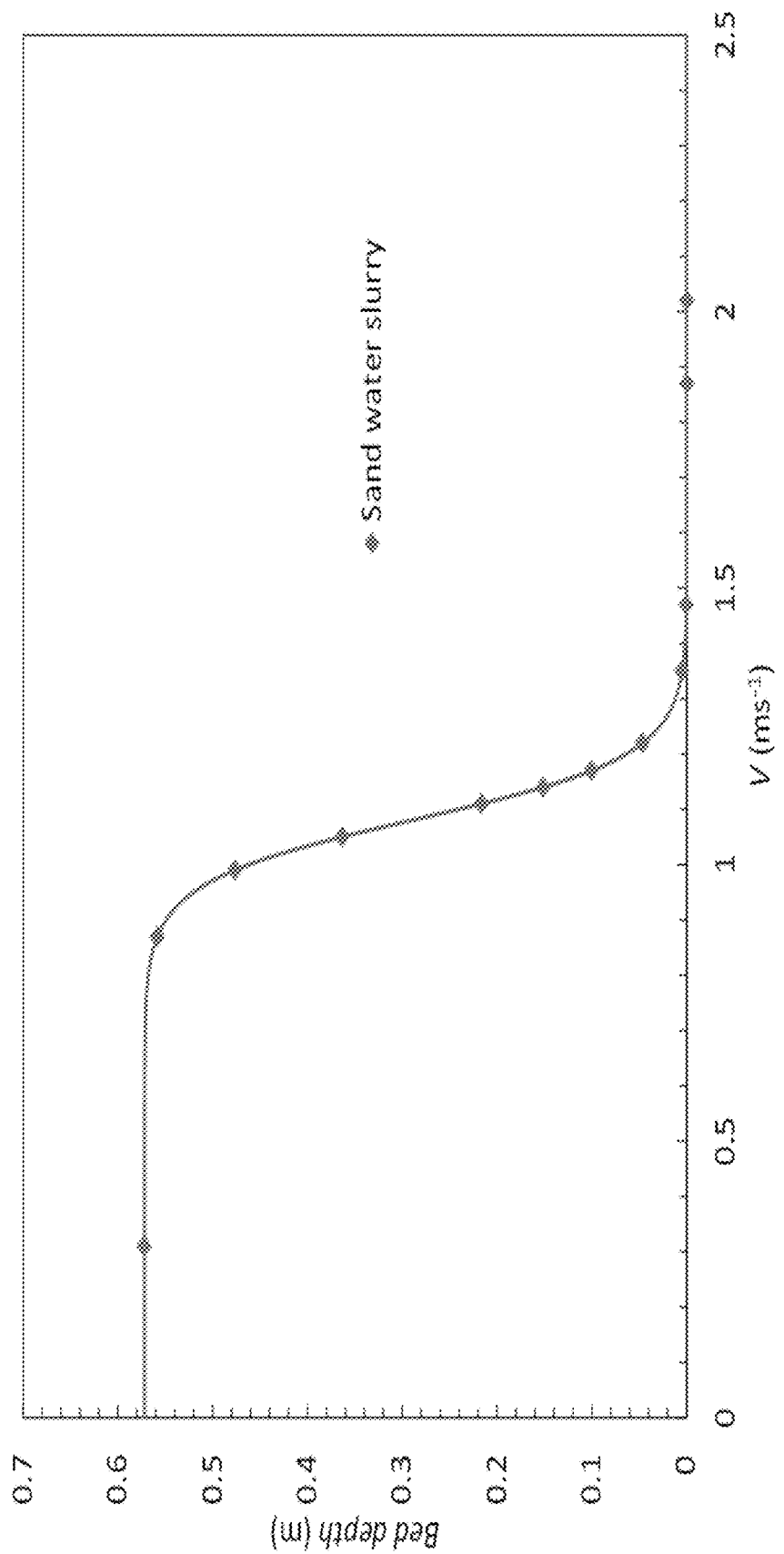
FIG. 7 is a graph depicting the variation in bed depth with axial flow rate.

As shown in FIG. 7, the power consumption data for a given heater can then be converted, using knowledge of the conduit and heater geometry, to the depth of the settled bed of solids in the conduit. An example of determining the depth of a settled bed of solids from power consumption data is described in more detail below. As such, referring to FIGS. 8 and 9, the device 100 further comprises a processor, for example as part of a master multipoint control unit (MCU) 170, configured to process the measured power consumption of each of the plurality of heaters 150, determine if settled solids are detected and cause an indication (e.g. 'yes' or 'no') to be raised. An indication of the depth of the settled bed of solids 300 in the conduit can also be determined, such as a selection from a possible set of ranges of depths or a specific numerical value.

The reference temperature sensor 140 provides an output 143 of the measured ambient temperature of the slurry, or "reference temperature", to the master MCU 170. The master MCU 170 determines the target temperature at a set value above the measured ambient temperature of the slurry, and provides a control output to the heater and temperature control module 180.

The heater and temperature control module 180 also receives temperature information 181 from the thermocouples 153 and provides a control output 182 to the heaters to heat the heaters to the target temperature. The current and voltage draw is measured for each heater by the voltage and current measurement module 183. The measured current and voltage draw is communicated to the master MCU 170 via the heater and temperature control module 180.

The master MCU 170 receives the measured current and voltage draw for each heater and, using calibration data for the device 100, determines if settled solids are detected. The master MCU may further determine the depth of the settled solids in the conduit. The master MCU 170 may then cause the indication to be raised such as lighting up a warning light or sound an alarm when the settled solids are detected or determined to be greater than a predetermined value.

In the embodiment shown in FIG. 8, slurry is supplied from an agitated tank 160 to a slurry pump 161 for pumping through the pipe 200. The pump 161 is driven by a variable-frequency drive (VFD) 162. In such a system, the master MCU 170 may also be configured to provide a control output 172 to the VFD to increase the speed of the slurry pump 161 when the settled solids are detected or determined to be greater than a predetermined value.

In some embodiments, the processor is further configured to receive input from instruments associated with the slurry transport system providing data relating to the slurry, for example rheology, density and other slurry properties. This data can then be processed with the indication of settled solids determined by the processor to provide a description of the slurry flow regime in the conduit.

Although the device has been described with reference to use with slurry systems, it will be appreciated that the device can be used for other multi-phase fluid systems having phases of differing densities that can separate. For example, in one embodiment, the device disclosed herein may also be used to detect settled solids in a conduit for a pneumatic conveyor system transporting solid particles in a gas carrier.

In another embodiment, the device disclosed herein may be used to detect the formation of scaling on an inner conduit wall.

Determining the Depth of a Settled Bed of Solids from Power Consumption Data

Figure 10:
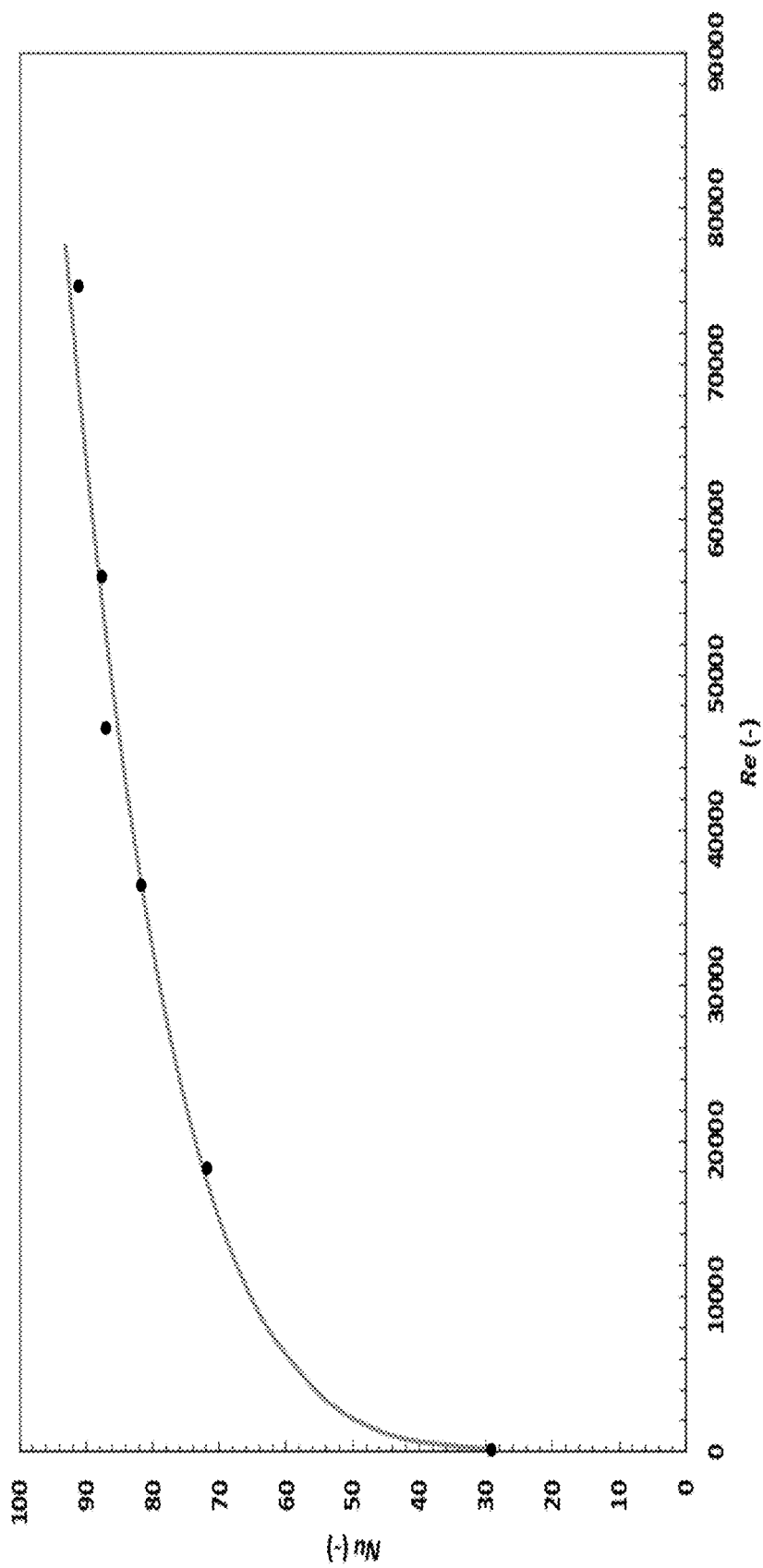
FIG. 10 is a graph depicting a calibration curve for a device according to an embodiment of the present disclosure.

Prior to installation of a device, each heater is individually calibrated. This is conducted over a range of expected flow rates in the conduit. The calibration is conducted on the carrier fluid of the slurry only (typically water) with no solids present. The calibration is a relationship between heat flux and fluid flow rate expressed as Nusselt number as a function of pipe Reynolds number; Nu(Re) (see FIG. 10). The relationship is stored as a simple equation, e.g. a power function or a polynomial relationship. Velocity values (for calculating Re) are derived from a suitable flowmeter (a magnetic flowmeter in this case).

During operation, each heater will produce continuous data, for example as is shown in Table 1, where:
T0 is the reference temperature;
T2 is the temperature at the surface of heater 2; and
V and A are the voltage and current applied to heater 2.

TABLE 1

Example of data produced by heater

| Time | T0 | ... | T2 | V | A | ... |
|---|---|---|---|---|---|---|
| 10:32:14 | 15.22087 | | 15.20374263 | 0 | 0 | |
| 10:32:19 | 15.220694 | | 19.01767563 | 2.905 | 0.521 | |
| 10:32:24 | 15.22069 | | 20.32724863 | 2.595 | 0.48 | |
| 10:32:29 | 15.226043 | | 20.41734763 | 2.531 | 0.482 | |
| 10:32:34 | 15.223943 | | 21.10544663 | 2.754 | 0.495 | |
| 10:32:39 | 15.226092 | | 20.85827663 | 2.561 | 0.474 | |
| 10:32:44 | 15.227701 | | 21.08766163 | 2.651 | 0.484 | |
| 10:32:49 | 15.228167 | | 20.98511863 | 2.554 | 0.475 | |
| 10:32:54 | 15.230232 | | 21.04874863 | 2.584 | 0.478 | |
| 10:32:59 | 15.233821 | | 21.01898863 | 2.561 | 0.474 | |
| 10:33:04 | 15.232555 | | 21.03393163 | 2.568 | 0.474 | |
| 10:33:09 | 15.231225 | | 21.01779263 | 2.555 | 0.473 | |
| 10:33:14 | 15.23366 | | 21.02577163 | 2.557 | 0.472 | |
| 10:33:19 | 15.22919 | | 21.02363663 | 2.549 | 0.471 | |
| 10:33:24 | 15.233437 | | 21.02092063 | 2.544 | 0.471 | |
| 10:33:29 | 15.235999 | | 21.00935063 | 2.543 | 0.471 | |
| 10:33:34 | 15.234337 | | 21.02459363 | 2.546 | 0.47 | |
| etc. | | | | | | |

Figure 11:
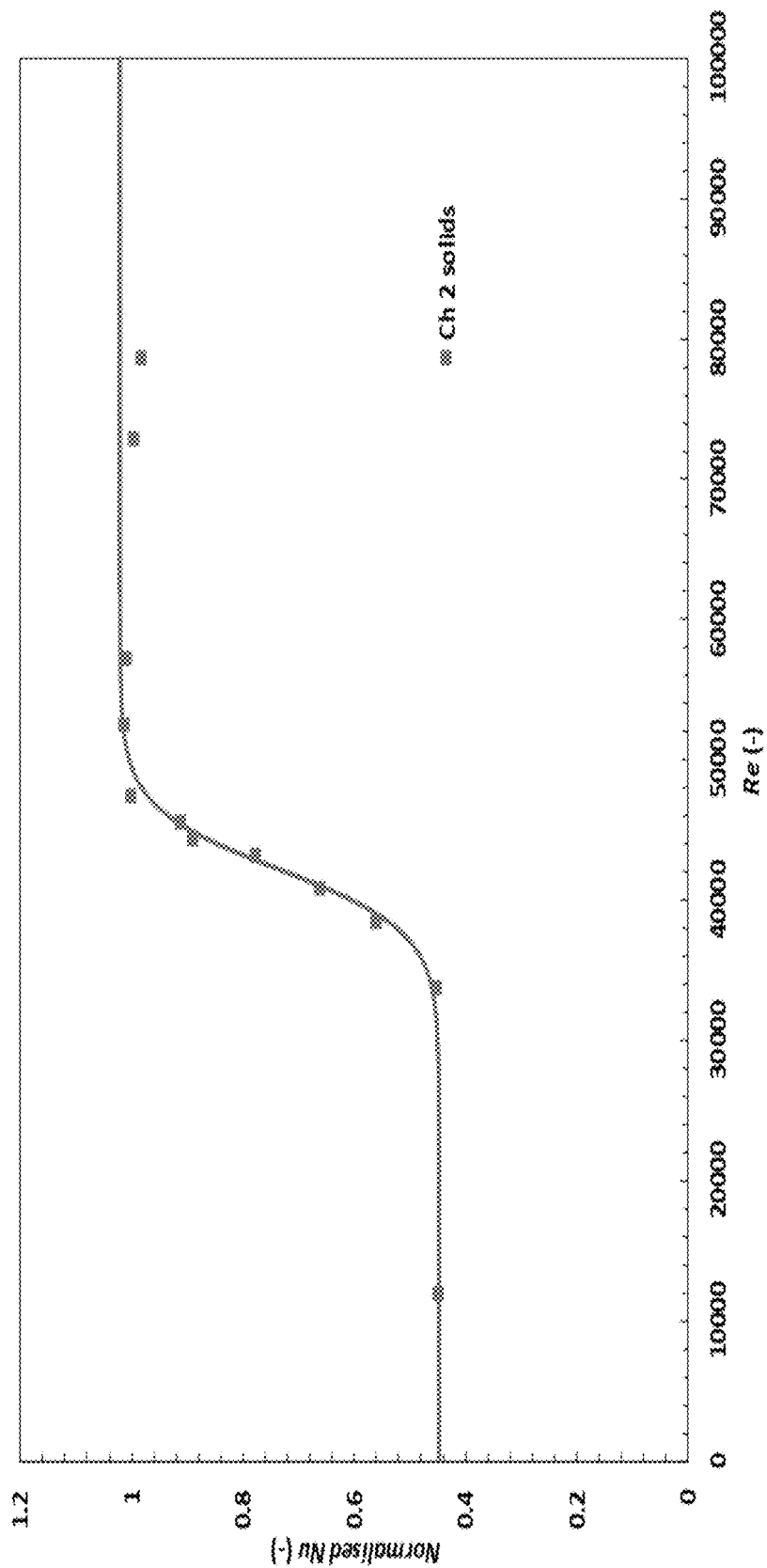
FIG. 11 is a graph depicting a normalised operating curve for the device of FIG. 10.

In the example of Table 1, the reference temperature is 15.2° C. and the target temperature of each heater is 6° C. above the reference temperature. Similar data is recorded simultaneously for all heaters. During operation particles are present in the pipe. Over a range of flowrates a range of different power draws may be recorded given the conditions of flow rate and settling of the particles. Only a single condition need be recorded to calculate depth, a more complete set of data points is shown in FIG. 11. The data is normalised by dividing the measured Nu value by the Nu value at the same Reynolds number for the no solids condition (i.e. from the calibration).

The proportion of the sensor that is covered by settled solids is determined by the ratio of:

$$\text{Nu(measured)} - \text{Nu(zero flow)} / (1 - \text{Nu(zero flow)})$$

Figure 12:
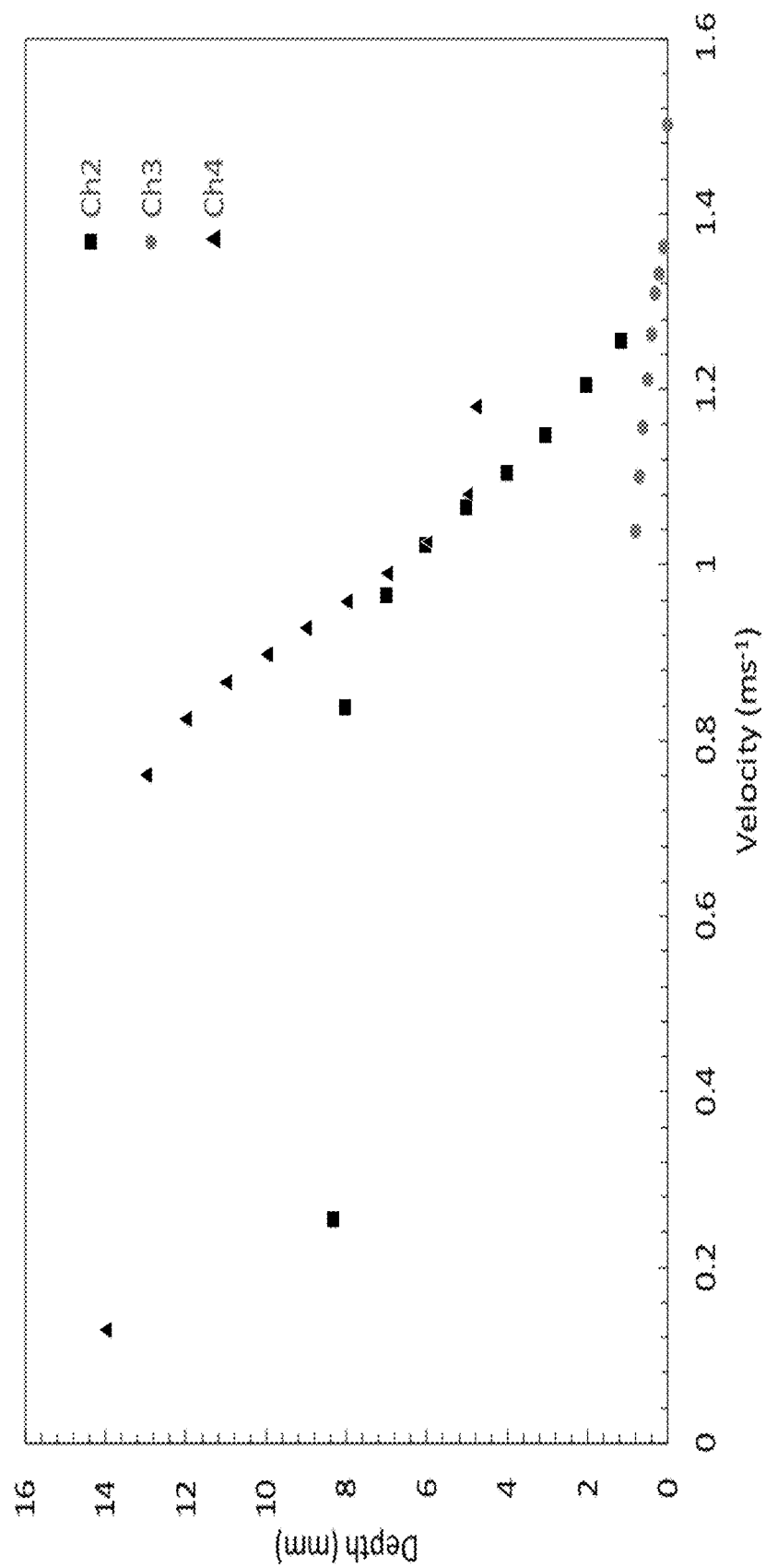
FIG. 12 is a graph for determining a depth of settled solids for the device of FIGS. 10 and 11.

In this example at Re=42000 the normalised Nu value is half way between the maximum and minimum Nu values. This correlates to the sensor being half covered in solids. From this information and a knowledge of the unit's geometry the height of solids bed above the invert can be calculated. Repeating the process for all heaters, the bed depth at any velocity can be determined (see FIG. 12).

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A device for use in detecting settled solids in a conduit for transporting slurry comprising:
   a housing to define at least a segment of a flow path of the slurry;
   a reference temperature sensor associated with an inside of the housing to measure an ambient temperature of the slurry; and
   a plurality of heaters spaced on at least part of a circumference of the inside of the housing that are maintained at a target temperature that is higher than the ambient temperature of the slurry, wherein a surface of each heater is directly exposed to the flow path of the slurry.

2. The device according to claim 1, wherein the housing is configured such that the heaters are thermally isolated from one another.

3. The device according to claim 1, wherein the housing is formed of a thermally insulating material.

4. The device according to claim 1, wherein the heaters are positioned in the housing so as to be thermally insulated from one another.

5. The device according to claim 1, wherein the target temperature is no more than 10° C. above the ambient temperature of the slurry.

6. The device according to claim 1, wherein the reference temperature sensor is associated with the housing by being positioned at or near an obvert of the housing.

7. The device according to claim 1, wherein at least one heater is positioned at or near an invert of the housing.

8. The device according to claim 1, further comprising a thermal sensor associated with each heater to measure the temperature of the heater.

9. The device according to claim 1, further comprising a temperature control module for maintaining each heater at the target temperature.

10. The device according to claim 1, wherein the housing comprises a pair of annular flanges joined by a cylindrical conduit to define the segment of the flow path.

11. The device according to claim 10, wherein the flanges have apertures for receiving fasteners to mount the housing to the conduit.

12. The device according to claim 1, wherein surfaces of the reference temperature sensor and the plurality of heaters are substantially continuous and level with an inner surface of the housing.

13. The device according to claim 12, wherein the surfaces of the reference temperature sensor and the plurality of heaters are replaceable.

14. The device according to claim 1, wherein the plurality of heaters are substantially linearly aligned along at least part of the circumference of the inside of the housing.

15. The device according to claim 14, wherein the reference temperature sensor is substantially linearly aligned with the plurality of heaters.

16. A system for detecting settled solids in a conduit for transporting a slurry comprising:
   the device of claim 1;
   a meter for measuring power consumed by the plurality of heaters; and
   a processor configured to determine an indication of whether there are settled solids in the conduit based on the power consumed by the plurality of heaters.

17. The system according to claim 16, wherein each heater comprises a temperature control module, wherein the temperature control module utilises a proportional-integral-derivative (PID) control loop feedback mechanism to maintain the temperature of the slurry immediately adjacent to that heater at the target temperature.

18. A method for detecting settled solids in a conduit for transporting a slurry, the method comprising:
   measuring an ambient temperature of a slurry in the conduit;
   supplying power to a plurality of heaters that are spaced on at least part of a circumference inside the conduit to maintain the heaters at a target temperature that is higher than the ambient temperature of the slurry, wherein a surface of each heater is directly exposed to the flow path of the slurry;
   measuring power consumed by the plurality of heaters; and
   determining an indication of whether there are settled solids in the conduit based on the power consumed by the plurality of heaters.

19. The method according to claim 18, wherein the method further comprises determining the depth of the settled solids in the conduit.

* * * * *

UNITED STATES PATENT AND TRADEMARK OFFICE
CERTIFICATE OF CORRECTION

| | | |
|---|---|---|
| PATENT NO. | : 11,378,533 B2 | Page 1 of 1 |
| APPLICATION NO. | : 16/649727 | |
| DATED | : July 5, 2022 | |
| INVENTOR(S) | : Chryss et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 114 days.

Signed and Sealed this
Twenty-first Day of January, 2025

Coke Morgan Stewart
*Acting Director of the United States Patent and Trademark Office*